United States Patent

Baba et al.

[11] Patent Number: 5,804,117
[45] Date of Patent: Sep. 8, 1998

[54] MOLDING METHOD FOR RESIN ARTICLES

[75] Inventors: Nobuyoshi Baba; Tadamasa Kidera, both of Aichi, Japan

[73] Assignee: Toyoda Gosei Co., Ltd., Aichi-Ken, Japan

[21] Appl. No.: 915,082

[22] Filed: Aug. 20, 1997

Related U.S. Application Data

[63] Continuation of Ser. No. 417,054, Apr. 5, 1995, abandoned.

[30] Foreign Application Priority Data

| Apr. 5, 1994 | [JP] | Japan | 6-067458 |
| Apr. 26, 1994 | [JP] | Japan | 6-088918 |

[51] Int. Cl.[6] .......................... B29C 45/14; B29C 45/27; B29C 45/38; B29C 45/40
[52] U.S. Cl. ........................ 264/161; 264/251; 264/263; 264/510
[58] Field of Search .................... 264/161, 250, 264/255, 259, 275, 510, 511, 553, 251, 261, 263, 334; 425/120, 121, 130, 572, 573

[56] References Cited

U.S. PATENT DOCUMENTS

| 3,169,899 | 2/1965 | Steuber | 264/123 |
| 3,247,550 | 4/1966 | Haines, Jr. | 264/275 |
| 3,403,862 | 10/1968 | Dworjanganyn . | |
| 3,485,706 | 12/1969 | Evans . | |
| 3,532,589 | 10/1970 | David . | |
| 4,152,389 | 5/1979 | Miller | 264/184 |
| 4,839,118 | 6/1989 | Labrie | 264/46.5 |
| 4,878,827 | 11/1989 | Muller | 425/434 |
| 4,994,226 | 2/1991 | Nakagawa et al. | 264/261 |
| 4,997,707 | 3/1991 | Otawa et al. | 264/267 |
| 5,023,130 | 6/1991 | Simpson et al. . | |
| 5,133,912 | 7/1992 | Hagiwara et al. | 264/275 |

FOREIGN PATENT DOCUMENTS

| 0268954 | 6/1988 | European Pat. Off. . |
| 0288130 | 10/1988 | European Pat. Off. . |
| 2262588 | 9/1975 | France . |
| 57-208245 | 12/1982 | Japan . |
| 62-19419 | 1/1987 | Japan . |

OTHER PUBLICATIONS

"Tyvek Softening Process" Research Disclosure, No. 21126, P.403 (Nov. 1981).

*Primary Examiner*—Angela Ortiz
*Attorney, Agent, or Firm*—Cushman Darby & Cushman IP Group of Pillsbury Madison & Sutro LLP

[57] ABSTRACT

A molded article has a resinous substrate body, and an elastic sheet material, at least partially fused thereto. For molding, the pre-formed elastic sheet material is oriented so as to be in contact with a setting face of an open mold. Further, a molten resin material is injected into a cavity defined within the closed mold via a gate so that the cavity is filled with the resin material. The gate has a substantially thin, rectangular shape in cross-section, and forms a rib integral with and projecting rearwardly from the molded resin substrate body. The integrally formed rib is molded from resin material left remaining in the gate after the molten resin material is injected into the cavity.

34 Claims, 13 Drawing Sheets

MOLDING METHOD FOR RESIN ARTICLES

This is a continuation of application Ser. No. 08/417,054, filed on Apr. 5, 1995, which was abandoned upon the filing hereof.

FIELD OF THE INVENTION

The present invention relates to a method for molding resin products which are constituted by a sheet material which is partially thermally fused onto a substrate surface, of which automobile instrument panels, or the like, are a representative example.

BACKGROUND OF THE INVENTION

Generally, instrument panels for automobiles are composed from a substrate consisting of hardened resin, and an elastic sheet material which is fused onto the substrate. From a structural standpoint, instrument panels are roughly classified as "full pad type" which provides the elastic sheet material over the entire surface of the resin substrate; "half-pad type" where part of the substrate is exposed; and "padless type" which consists of the substrate alone.

For example, as shown in FIG. 8, a substrate 52 of a "half-pad type" instrument panel 51, which is often employed in mass-produced cars, requires a predetermined degree of rigidity and moldability. Consequently, substrate 52 is formed with ABS (acrylonitrile-butadiene-styrene) and PP (polypropylene) as its main components. Moreover, elastic sheet material 53 includes, for example, a cushion layer 54 of resiliently soft polyurethane foam, and an epidermal layer 55 consisting of PVC (polyvinyl chloride), or the like.

The instrument panel 51 is formed, for example, in the following manner. First, the elastic sheet material 53 is formed beforehand into a predetermined shape by a conventional vacuum molding process or the like. Next, as shown in FIG. 9, the elastic sheet material 53 is oriented in a predetermined position inside a molding device 56 which is used to mold the substrate 52. This molding device 56 has a fixed mold 57 and a movable mold 58, and these two molds 57 and 58 together define a cavity 59 in which the substrate 52 is molded. A plasticized resin material is injected into this cavity 59 from a gate 60 formed in fixed mold 57. The substrate 52 is then formed by molding the resin material. The elastic sheet material 53 is subsequently thermally fused to the surface of the substrate 52. Thereafter, excess resin remaining in the gate 60 is removed, and the aforementioned instrument panel 51 is thereby obtained.

As another example of conventional manufacture, FIG. 17 illustrates a configuration where an ejection pin 61 is provided in the fixed mold 57. In this case, after the aforementioned injection and thermal fusion processes have been performed, the two molds 57 and 58 are opened, and the aforementioned instrument panel 51 is separated therefrom by pushing up the ejection pin 61 provided in the fixed mold 57, thereby separating the instrument panel 51.

Yet, with regard to the technology of FIG. 9, the resin material is injected into the cavity 59 from the nozzle (hot runner) of the injection molding machine via the gate 60. At this time, the hot resin material sometimes directly reaches the interior of the cavity 59 and directly contacts the cushion layer 54 of the elastic sheet material 53 or the like. The cushion layer 54 is therefore directly affected by the pressure and heat of the resin material. As a result, the cushion 54, or the like, can be damaged or deformed, thereby deteriorating the external appearance of the finished article.

In addition, to simplify the configuration of the molding device 56, the gate 60 is formed parallel to the direction of movement of the movable mold 58, (i.e., substantially diagonal to the lengthwise direction of the cavity 59. Moreover, the interior space of the gate 60 which opens onto cavity 59 constitutes part of a truncated cone. For this reason, with the aforementioned conventional technology, the aperture of the part of gate 60 which opens to the cavity 59 has a shape of an oval with a comparatively large aperture area, as shown in FIG. 10. Consequently, immediately after molding, an excess part of the resin material which projects from the substrate 52 and which corresponds to the gate 60 is relatively thick (nearly round) and extremely large in sectional area. For this reason, the time required for cooling and thereby solidifying the resin substrate varies greatly between portions corresponding to the gate 60 and other portions thereof. In addition, so-called "sink marks" in the surface of the substrate 52 may appear as it cools. As a result, a marked deterioration in the external appearance of the finished article is possible.

On the other hand, as seen in FIG. 17, a configuration is adopted wherein the resin supply mechanism, including the gate 60, and the extrusion mechanism designed to push up the molded object after opening of the molds, are both provided in the fixed mold 57. The ejection mechanism not only includes the extrusion pin 61, but also a drive source like a cylinder, etc., which are normally provided in the movable mold. Yet, with this technology, the extrusion mechanism must be provided inside the fixed mold 57 due to the fact that the elastic sheet material 53 is provided on the movable mold 58 side. This leads to a marked rise in manufacturing cost.

Moreover, since the resin supply mechanism and the extrusion mechanism are both provided in the fixed mold 57, the internal mechanics of the fixed mold 57 tend to become very complex. In addition, the two mechanisms may interfere with one another, and the design of the molding device 56 itself may be impeded.

SUMMARY OF THE INVENTION

The present invention was made in order to resolve the above-described problems. With regard to resin products including a substrate body and a sheet material which is thermally fused thereon, an object is to provide a method for molding resin products which can suppress occurrence of sink marks and damage to the sheet material during molding, and which can consistently prevent any deterioration in the external appearance of finished products.

A second object, which relates to the manufacture of the above-described resin products, is to provide a method for molding such resin products which is low-cost, and a molding device for molding the resin products which can bring about cost reduction and an improvement in the freedom of design.

According to a first embodiment of the invention, a sheet material is first molded into a predetermined shape by a vacuum molding method. Moreover, a molding device is prepared which has a first mold provided with a first molding face, and a second mold provided with a second molding face and which is selectively engageable with the first mold. Furthermore, when the surface of the sheet material almost contacts a setting face of the first mold, the sheet material is set inside a cavity defined by the first molding face and the second molding face.

A plasticized resin material is then injected into the cavity through at least one gate provided in the second mold so as to fill the cavity. After the resin material is cooled, the resultant resin substrate body which has the sheet material thermally fused to a part of its surface is removed from the molding device. As a result of this process, a resin product is molded which includes a substrate body made of resin material and a sheet material that is thermally fused to part of the substrate.

According to the first embodiment of the present invention, the injected resin material fills the interior of the cavity only after it has been dispersed inside the gates. At this time, it is difficult for the injected resin material to impinge directly upon the sheet material. Direct and/or local application of pressure and heat from the hot resin material is thereby suppressed. Consequently, damage to the sheet material is avoided.

Moreover, because the gates according to the present invention are flat in cross-section, and because there is resin material remaining therein, ribs are integrally formed with the substrate body which project rearwardly from the substrate body. Since the excess resin material in the gate is formed like a flattened rib, no major variations occur in solidification time during cooling, and the occurrence of so-called "sink marks" on the surface of the substrate body is avoided.

Furthermore, according to the present invention, the resin product itself can be structurally reinforced by the ribs corresponding to the gates, thereby increasing strength and rigidity.

According to a second embodiment of the present invention, a sheet material is molded into a predetermined form by a vacuum molding method. A molding device is prepared which includes a first mold and a second mold arranged so as to be selectively engageable with one another. Furthermore, when the surface of the sheet material almost contacts the setting face of the first mold, the sheet material is set inside a cavity defined by the first molding face of the first mold, and the second molding face of the second mold.

Next, a plasticized resin material is injected via a connecting channel provided in the first mold by at least one gate provided in the second mold from a injection molding device into the interior of the cavity to fill it. Thereafter, the first mold and the second mold are opened or separated, and the resin substrate body with the sheet material thermally fused to part of its surface is removed from the molding device by an extrusion mechanism provided in the second mold. The finished resin product is thus obtained.

According to the second embodiment of the present invention, a resin material from an injection molding device is first directed into a connecting channel provided in the first mold. That is, a resin supply mechanism is provided on the first mold side. On the other hand, an extrusion mechanism is provided in the second mold. Consequently, no interference occurs between the resin supply mechanism and the extrusion mechanism.

BRIEF DESCRIPTION OF THE DRAWINGS

The invention will be disclosed in detailed with reference to the following drawings wherein.

DETAILED DESCRIPTION OF THE INVENTION

Embodiment 1

A first embodiment for carrying out the present invention is explained, based on FIG. 1 to FIG. 7.

Figure 2:
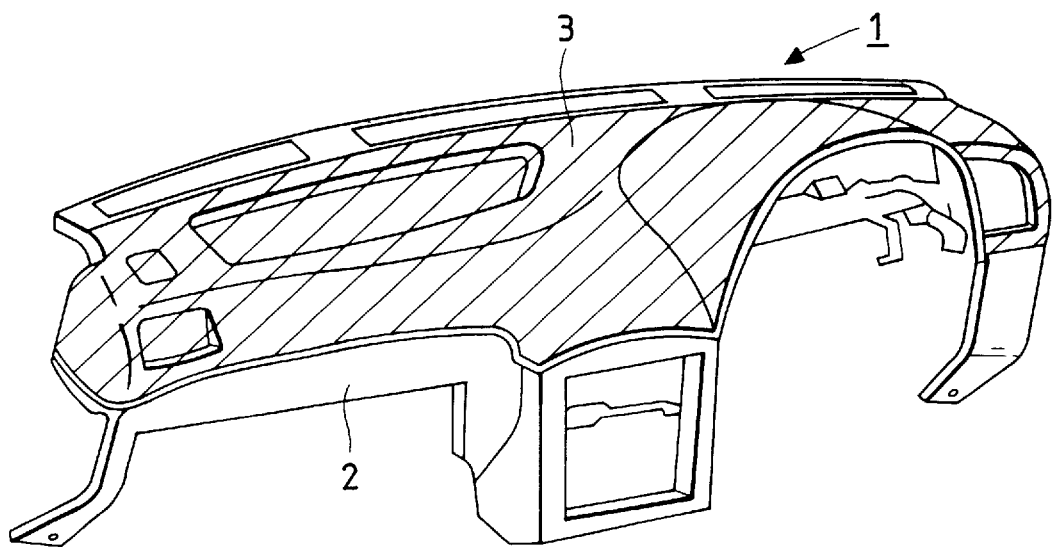
FIG. 2 is a perspective view of the instrument panel in FIG. 1.

As shown in FIG. 2, an automobile instrument panel 1 is arranged in front of the driver seat and passenger seat of an automobile. The instrument panel 1 is a resin shell surrounding an instrument board. This instrument panel 1 has a substrate body 2 which is at least partially covered by an elastic sheet material 3 attached to the top (i.e. exterior) face of the substrate body 2 (as indicated by diagonal line hatching). The instrument panel 1 of this embodiment is a "half pad type", which is often used in mass-produced cars. A portion of the substrate body 2 is not covered by the elastic sheet material in the "half pad type" panel.

Figure 3:
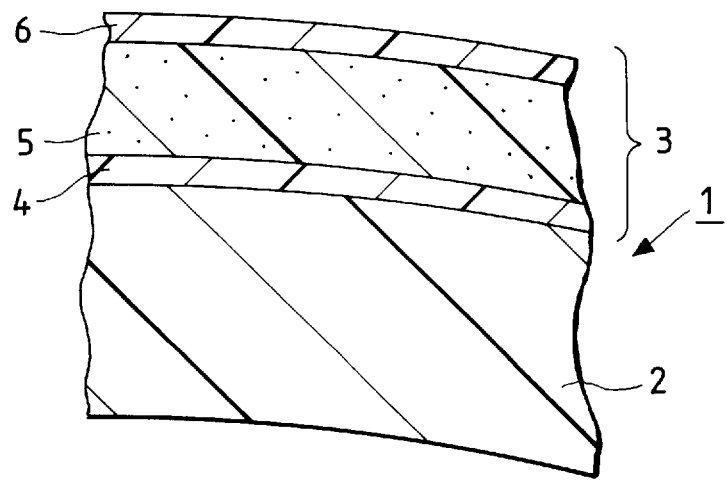
FIG. 3 is an enlarged partial sectional view of the instrument panel in FIG. 1.

Referring to FIG. 3, the substrate body 2 is formed of, for example, polypropylene mixed with filler (filler-mixed PP) and has a predetermined degree of rigidity. Elastic sheet material 3 has a composite layer structure. In sequence from the inner layer side (lower side of the drawing), it is composed from a thermal fusion layer 4 of, for example, polypropylene, a cushion layer 5 of, for example, polypropylene foam which is positioned to the outside of the thermal fusion layer 4, and a solid epidermal layer 6 of, for example, polyvinyl chloride (PVC) which is positioned to the outside of the cushion layer 5. In the present embodiment, the thermal fusion layer 4 of the elastic sheet material 3 is thermally fused onto the substrate body 2. Consequently, a seal is established between the elastic sheet material 3 and the substrate body 2.

Figure 1:
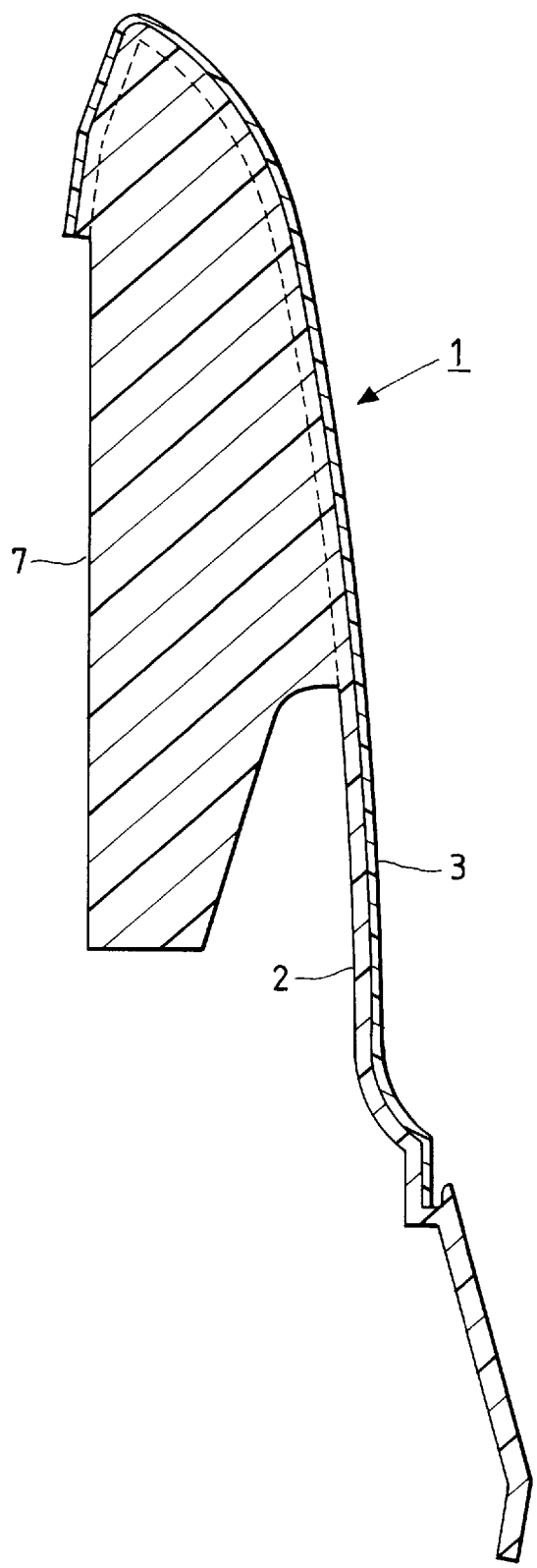
FIG. 1 is a sectional view which shows an exemplary instrument panel according to the present invention.

As shown in FIG. 1, ribs 7 made from the resin material project rearwardly (toward left side of drawing) and are integrally formed with the substrate body 2. A plurality of these ribs 7 are provided at predetermined intervals. In the present embodiment, the thickness of the ribs 7 is between about 3 mm to 5 mm.

Figure 4:
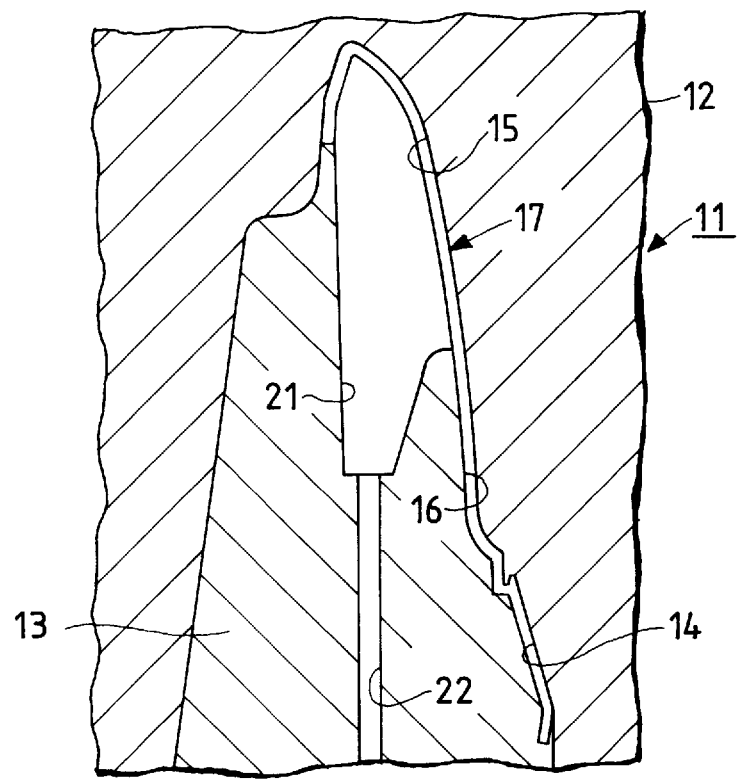
FIG. 4 is a sectional view which shows the molding device designed to mold the instrument panel seen in FIG. 1.

Next, a molding device 11 which is designed to mold the substrate body 2 of the instrument panel 1 is described. As shown in FIG. 4, the molding device 11 is provided with a movable mold 12 constituting the first mold, and a fixed mold 13 constituting the second mold. The movable mold 12 is arranged so as to be selectively engageable with the fixed mold 13. The movable mold 12 has a first molding face 14 designed to form part of the substrate body 2, and a setting face 15 on which the preformed elastic sheet material 3 is set prior to forming the substrate body 2. Furthermore, the fixed mold 13 has a second molding face 16. When the movable mold 12 and the fixed mold 13 are engaged, the first molding face 14 and the second molding face 16 oppose each other, thereby defining a molding cavity 17 for forming the substrate body 2.

In addition, according to this embodiment, a plurality of gates 21 (only one is shown in the drawing) are provided which open into the cavity 17. A runner 22 connecting a respective gate 21 and an end face of the fixed mold 13 is formed in the fixed mold 13.

The gates 21 are each substantially parallel to the direction of movement of the movable mold 12. The gates 21 have a generally rectangular cross-section, and their cross-sectional width corresponds to the thickness of the resultant ribs 7. In other words, the gates 21 not only connect channels for injecting resin material to the molding cavity 17, but also play a role in molding the ribs 7. Furthermore, the gates 21 have sufficient width so that the resin material traversing their interior is dispersed.

Next, the manufacturing method of the instrument panel 1 in the present embodiment is explained.

First, the elastic sheet material 3 is manufactured in advance. That is, a planar sheet with the aforementioned three-layer structure, for example, is formed beforehand. Next, using a known vacuum molding method, the planar sheet is molded into a shape conforming to the shape of the top face of the instrument panel 1. Thereafter, excess portions of the planar sheet are removed by trimming. By this series of steps, the elastic sheet material 3 is obtained.

Figure 5:
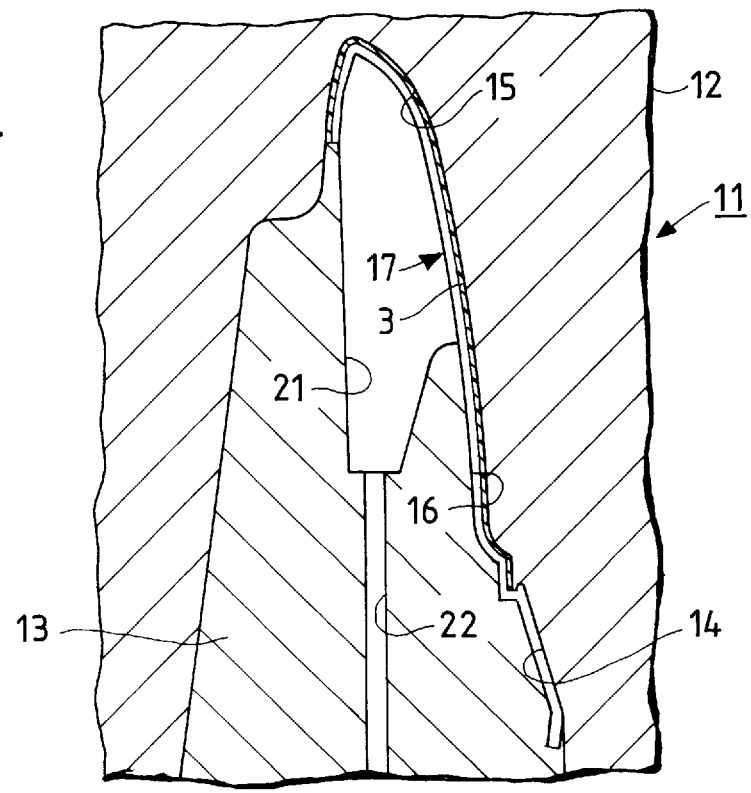
FIG. 5 is a sectional view which the sheet material is positioned inside the molding device.

Then, as shown in FIG. 5, the pre-formed elastic sheet material 3 is positioned in a predetermined location inside the molding cavity 17 of the molding device 11. More particularly, when the two molds 12 and 13 are opened (i.e., separated) the elastic sheet material 3 is placed against the setting face 15 of the movable mold 12. The movable mold 12 is then subsequently engaged with the fixed mold 13. At this time, the elastic sheet material 3 is disposed such that its solid epidermal layer 6 contacts the setting face 15.

Figure 6:
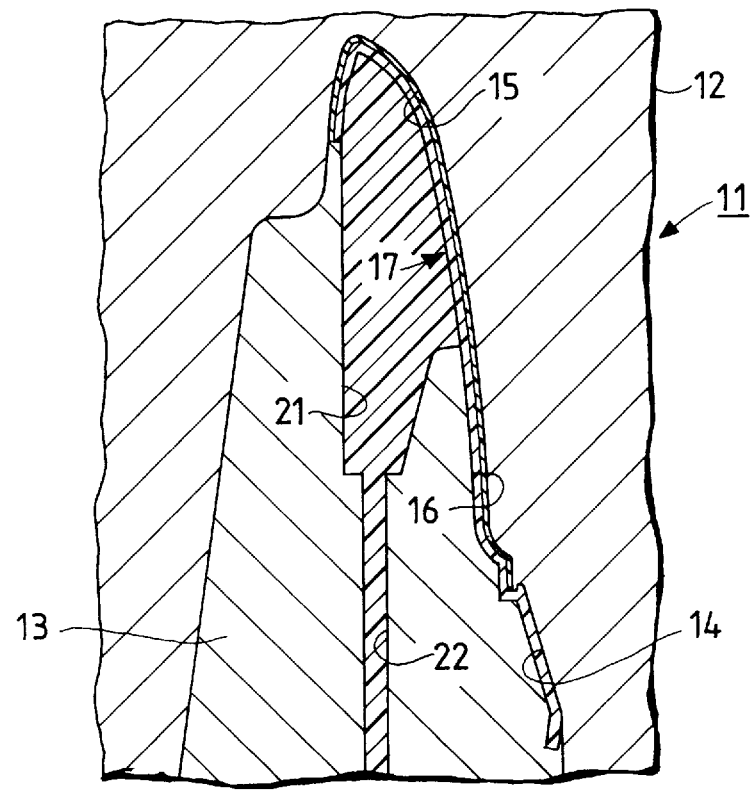
FIG. 6 is a sectional view which shows a part of the molding device where the gate exists, after resin has been injected inside the cavity interior.
Figure 7:
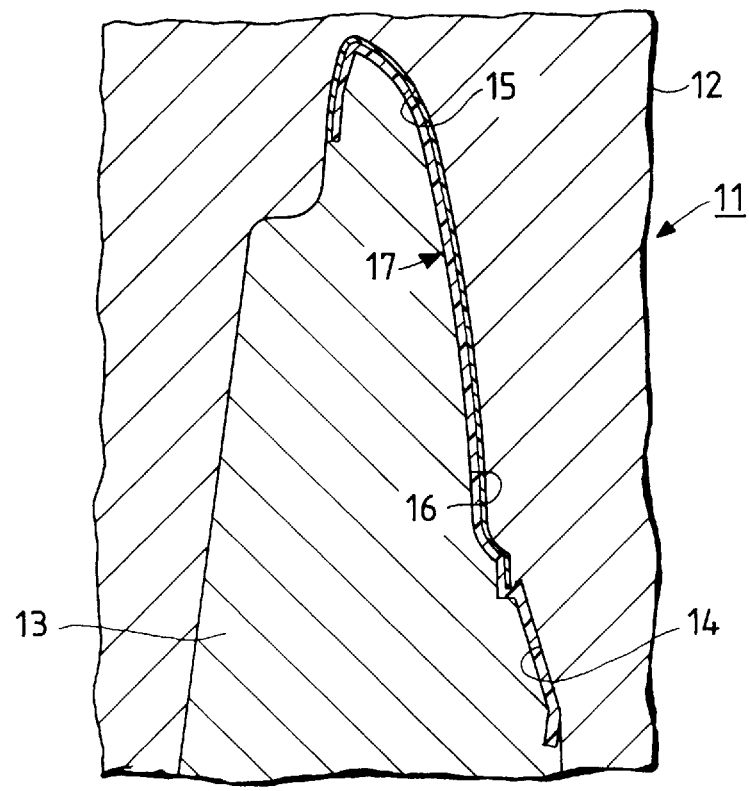
FIG. 7 is a sectional view which shows a part of the molding device in a plane spaced away from the gate, after resin has been injected inside the cavity.
Figure 8:
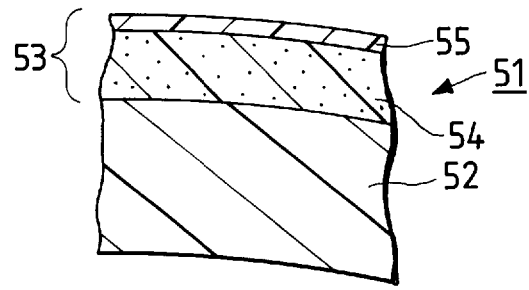
FIG. 8 is an enlarged partial sectional view which shows part of a conventionally-formed instrument panel.
Figure 9:
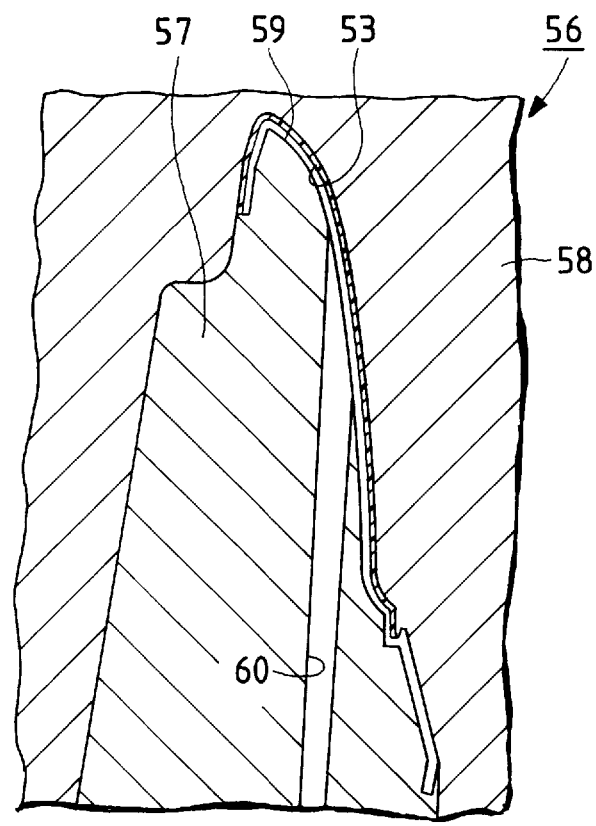
FIG. 9 is a sectional view which shows a conventional molding device designed to mold an instrument panel.
Figure 10:
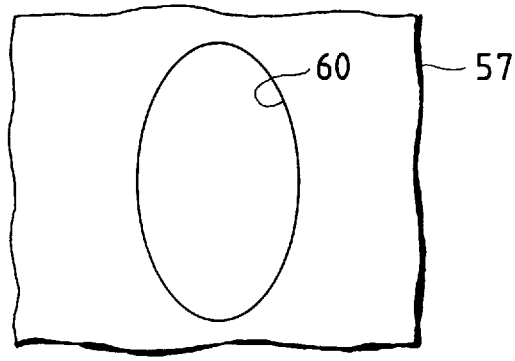
FIG. 10 is an end surface view which shows a gate aperture part of the conventional molding device.

Next, as shown in FIG. 6 and FIG. 7, an injection molding device (not illustrated) is used to inject plasticized filler-mixed PP (resin material) into the molding cavity 17 from the runner 22, via the gates 21. When this is completed, the resin material fills the interior of the cavity 17. At this time, the thermal fusion layer 4 of the elastic sheet material 3 is softened by the heat of the resin material. Thereafter, the resin material solidifies as it cools, so that the thermal fusion layer 4 is fused with the resin material. As a result of this fusion, the elastic sheet material 3 and the resin material (substrate body 2) are securely joined. The molds 12 and 13 are then opened and the substrate body 2 with attached elastic sheet material 3 is removed. Consequently, an instrument panel 1 is obtained which has ribs 7 integrally formed on the rear face of the substrate body 2.

In the instrument panel 1 obtained in such a manner, a predetermined degree of rigidity is provided by the substrate body 2 consisting of filler-mixed PP. A feeling of resilient softness to the touch is provided by the foam cushion layer 5 of the elastic sheet material 3. Glare-resistance, weather-resistance, heat-resistance, durability, good quality external appearance, etc. are provided by the exterior epidermal layer 6. Furthermore, sealing between the elastic sheet material 3 and the substrate body 2 is assured by the thermal fusion layer 4.

Moreover, in the present embodiment, the injected resin material fills the inside of the cavity 17 after being dispersed inside the gates 21. At this time, it is difficult for the resin material to directly impinge upon the elastic sheet material 3, so direct and localized application of the pressure and heat from the resin material is suppressed. It is therefore possible to avoid damage to the elastic sheet material 3 due to this pressure and heat. As a result, it is possible to avoid deterioration in the external appearance of the instrument panel due to damage to the elastic sheet material 3.

Furthermore, because the gates 21 have an approximately rectangular cross-sectional shape, and because there is resin material present inside the pertinent gates 21 after the molding process, rearwardly-extending ribs 7 are integrally formed with the substrate body 2. As a result, excess portions of resin material corresponding to the gates 21 have a flattened shape (like a thin wall), so the solidification time does not vary significantly during cooling. So-called "sink marks" on the surface of the substrate body 2 can therefore be avoided. Thus, it is possible to substantially avoid defects in external appearance due to the sink marks.

In addition, according to the present embodiment, the instrument panel 1 can be structurally reinforced by the ribs 7 corresponding to the gates 21. For this reason, simultaneous with the above effects, strength and rigidity can also be increased.

In addition, unlike the conventional method in which the resin material in the gate is wasted excess, the resin material in the gates are utilized as a part of the instrument panel 1. Accordingly, it is possible to reduce the waste of resin material and thereby improve manufacturing yield.

The present invention may be carried out with the following variations upon appropriate changes of parts of the configuration.

In the above-described first embodiment, the substrate body 2 was formed from filler-mixed polypropylene, but it is also acceptable to use propylene without filler(s). It is also acceptable to use other thermoplastic resins (such as ABS resin, or the like) which have a predetermined degree of rigidity after solidification thereof.

Furthermore, the elastic sheet 3 included the thermal fusion layer 4, the cushion layer 5, and the solid epidermal layer 6. However, the elastic sheet, may have any layer(s) as long as they include an epidermal covering, and as long as there are no other functional restrictions whatsoever with regard to the material. Accordingly, it is also acceptable to use a sheet material having, for example, only an epidermal layer, without the cushion layer 5.

The fixed mold 13 and the movable mold 12 in the foregoing embodiment may also be arranged upside down relative to the arrangement shown in the drawings.

In the first embodiment, the instrument panel 1 was used as an example of a molded resin product made according to the present invention, but resin products such as door trim, side garnish, and pillar garnish, or the like could also be manufactured according to the present invention.

In the foregoing embodiment, a plurality of ribs 7 were provided, but it is also acceptable to provide a rib 7 in at least one place.

The sectional form of the rib 7 was approximately rectangular, but there are no particular restrictions on its sectional form. It should have a generally thin shape to act as a rib projecting to the rear of the substrate body during the formation of the resin product. Accordingly, for example, the rib can have a curved sectional form which has a part which partially bulges. It is possible to cut parts of the ribs 7 to create a desired shape and size.

In the method for manufacturing resin products and the molding device disclosed in the first embodiment, a plurality of spaced-apart gates are provided at predetermined intervals. By using this configuration, the strength and rigidity of the resultant molded resin product can be markedly increased.

Further, the substrate body, and the part of the elastic sheet material which contacts the substrate body are characterized by both having the same material as their main component. By adopting this configuration, one can improve adhesion between the two.

According to the above-described embodiment, the occurrence of sink marks and damage to the sheet material during molding can be inhibited. Consequently, defects in external appearance can be avoided.

Embodiment 2

Next, a second embodiment of the present invention is explained. With regard to parts which are identical to those of the first embodiment, the same drawings (FIG. 1 to FIG. 3) and the reference numerals therein are used. Accordingly, detailed explanation of FIG. 1 to FIG. 3 is not repeated here.

Figure 11:
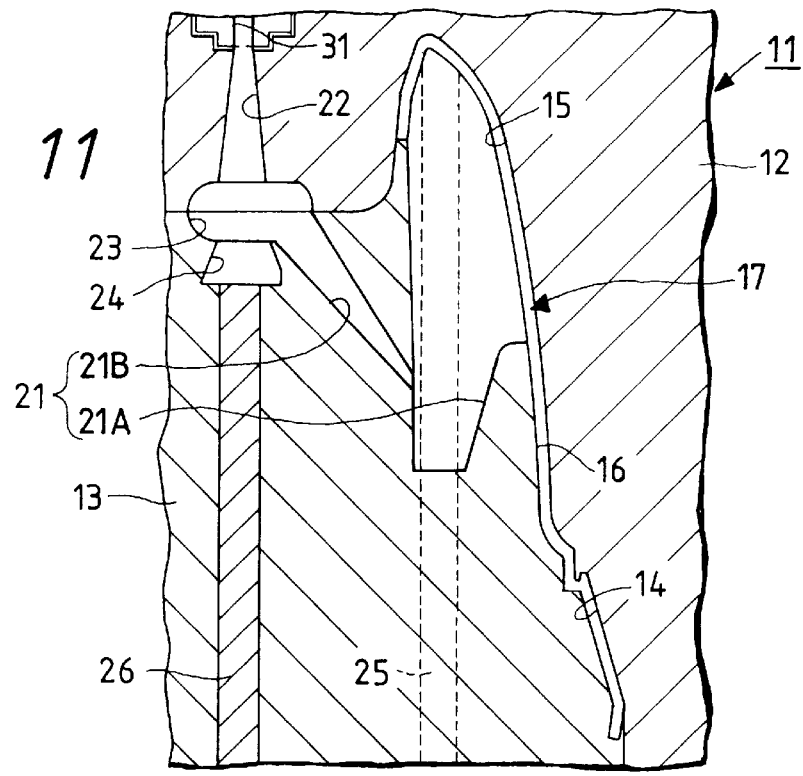
FIG. 11 is a partial sectional view which shows the molding device that is used during molding of the instrument panel, according to the present invention.

First, a molding device 11 designed to mold a substrate body 2 of an instrument panel 1 is described. As shown in FIG. 11, the molding device 11 has a fixed first mold 12, and a movable second mold 13. The fixed mold 12 is selectively engageable with the movable mold 13. The fixed mold 12 has a first molding face 14 and a setting face 15 where an elastic sheet material 3 is initially positioned. Furthermore, the movable mold 13 has a second molding face 16. The fixed mold 12 and the movable mold 13 (in particular, first and second molding faces 14 and 16) collectively define a molding cavity 17 for forming the substrate body 2.

In addition, a plurality of gates 21 (only one being shown in FIG. 11 for clarity) which open into the cavity 17 are provided in the movable mold 13. Moreover, runners 22, which serve as connecting channels between the gates 21 and the exterior of the fixed mold 12, are provided in the fixed mold 12.

The gates 21 are formed so as to extend approximately in parallel to the direction of movement of the fixed mold 12. Each gate 21 includes a main gate 21A which defines a flat, plate-like space therein, and a tunnel gate 21B which connects the runner 22 and the main gate 21A while avoiding the cavity 17.

The runner 22 and tunnel gate 21B together form an intermediate mold path between an exterior of the molding device (where a molten resin material is injected) and the main gate 21A. The intermediate mold path includes a first space 23 and a second space 24 which is formed beneath the first space 23 with an undercut shape, between, and in communication with, the runner 22 and the tunnel gate 21B.

The width (thickness) of the main gate 21A corresponds to and defines the thickness of a resultant molded rib 7. In other words, the main gate 21A is not only a channel for communicating a resin material into the molding cavity 17. Main gate 21A also functions to form the ribs 7. Furthermore, the main gate 21A has sufficient width so that resin material smoothly traverses the interior of the main gate 21A.

In the second embodiment, an extrusion mechanism for pushing up the molded substrate body 2 is provided in the movable mold 13. The extrusion mechanism includes extrusion pins 25 and 26 which can be extended and retracted in the movable mold 13 relative to the cavity 17 and the second space 24 respectively. The extrusion mechanism further includes a drive cylinder (not illustrated) for selectively actuating extrusion pins 25 and 26. After separating molds 12 and 13 of the molding device 11, these extrusion pins 25 and 26 are selectively projected from the movable mold 13 by the cylinder.

Next, an explanation is given concerning method for manufacturing the instrument panel 1 according to the second embodiment.

First, an elastic sheet material 3 is manufactured beforehand. That is, a planar sheet is formed having, for example, the aforementioned three-layer structure. Next, the elastic sheet material is conventionally vacuum-molded into a desired shape conforming to the top face of the instrument panel 1. Thereafter, excess parts of the sheet are removed by trimming. Thus, the desired elastic sheet material 3 is obtained.

Figure 12:
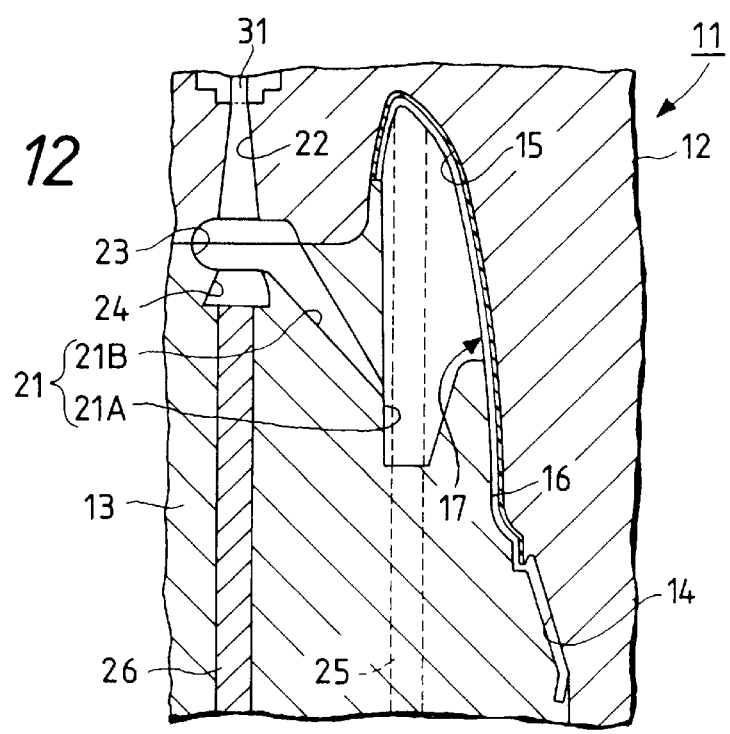
FIG. 12 is a sectional view showing where the sheet material is positioned inside the molding device.

As shown in FIG. 12, the pre-formed elastic sheet material 3 is oriented in a predetermined location inside the cavity 17 of the molding device 11. More particularly, while the two molds 12 and 13 are separated, the elastic sheet material 3 is placed against the setting face 15 of the fixed mold 12, and the fixed mold 12 is subsequently engaged with the movable mold 13. At this point, the elastic sheet material 3 is oriented so that its solid epidermal layer 6 contacts the setting face 15.

Figure 13:
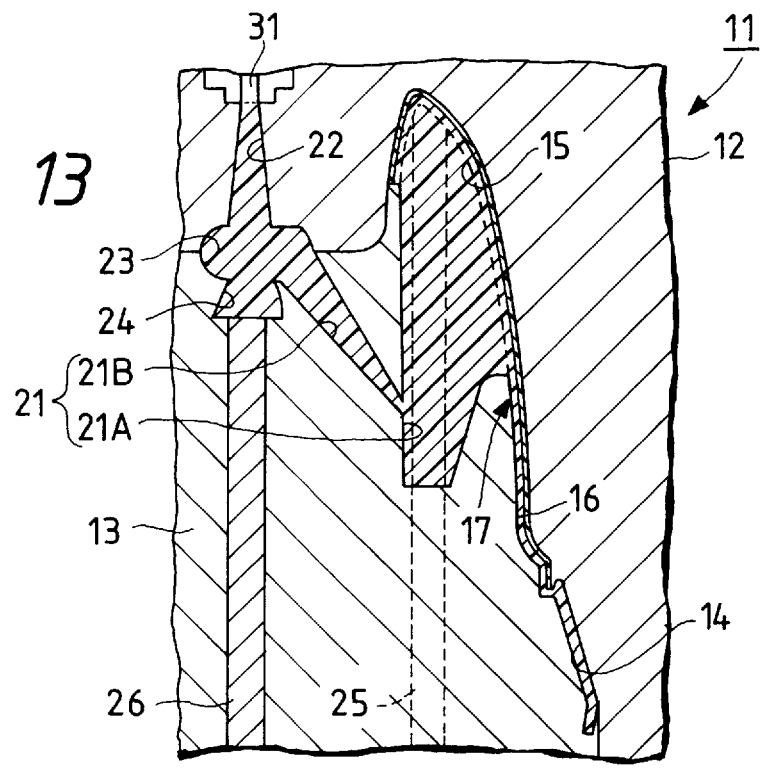
FIG. 13 is a sectional view which shows a part of the molding device including a main gate, after resin has been injected inside the cavity.
Figure 14:
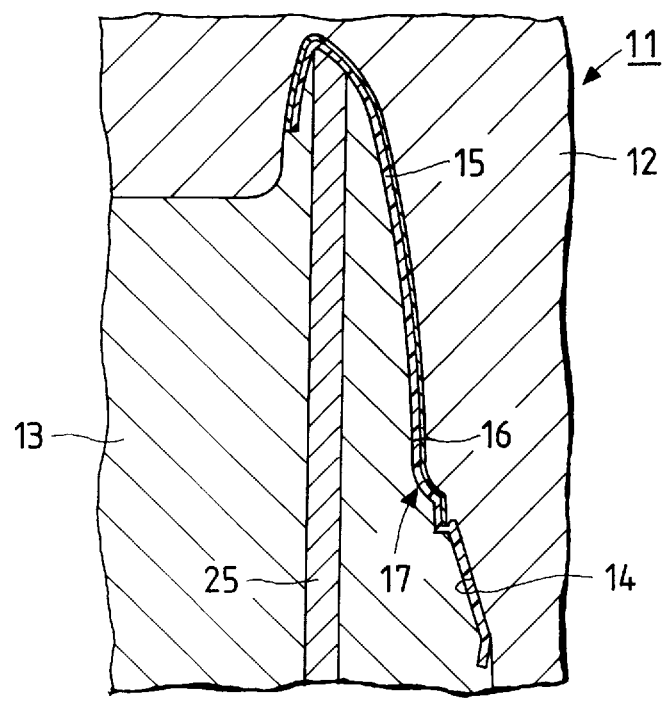
FIG. 14 is a sectional view which shows a section of the molding device away from the no main gate, after resin has been injected inside the cavity.

Next, as shown in FIG. 13 and FIG. 14, plasticized filler-mixed polypropylene (resin material) is injected into the cavity 17 from the runners 22 via the gates 21. When this injection step is completed, the resin material fills the interior of the cavity 17. At this point, the thermal fusion layer 4 is softened by the heat of the resin material. Thereafter, the resin material cools and solidifies so that the thermal fusion layer 4 is fused with the resin material. As a result, the elastic sheet material 3 and the now-solidified resin material (substrate body 2) are joined.

In the intermediate mold path (i.e., the runner 22 and tunnel gate 21B, along with first and second spaces 23 and 24), the resin material solidifies to form a resin plug or sprue 18.

Figure 15:
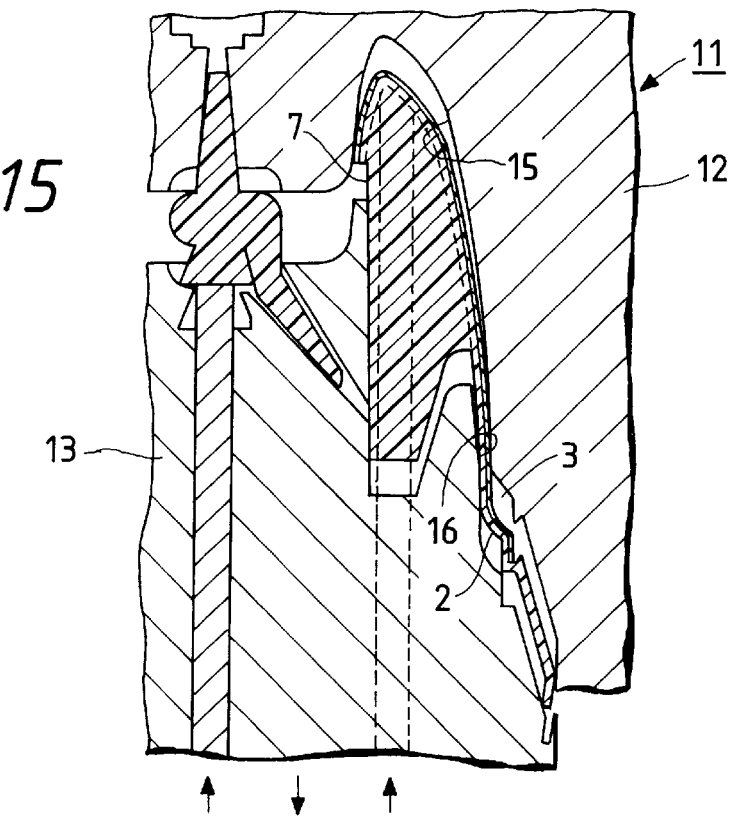
FIG. 15 is a sectional view which shows the state where the molds of the molding device are separated, and the extrusion mechanism is operated.

As illustrated in FIG. 15, the two molds 12 and 13 are separated. At this time, the substrate body 2 is retained closely against the movable mold 13 side due to, in part, the undercut shape of the second space 24, which resists separation from the movable mold 13. Next, the activation cylinder (not shown) operates so that the extrusion pins 25 and 26 project upward against the sprue 18 and the substrate body 2. When this occurs, the sprue 18 is shearingly separated from the substrate body 2 between tunnel gate 21B and main gate 21A is cut, and the molded substrate body 2 is raised up. The molded substrate body 2 with attached elastic sheet material 3 is thereby removed from the movable mold 13, and the instrument panel 1 is obtained. In addition, extrusion pin 26 ejects the resin sprue 18 to thereby clear the resin path for a subsequent molding operation.

With a instrument panel 1 obtained in such a manner, a predetermined degree of rigidity is provided by the substrate body 2 made from filler-mixed polypropylene. A feeling of resilient softness to the touch is provided by the cushion layer 5 of the elastic sheet material 3 which is attached to part of the substrate body 2, while wear-resistance and good quality external appearance, and so on, are provided by the solid epidermal layer 6. Furthermore, a secure bond between the elastic sheet material 3 and the substrate body 2 is realized by the thermal fusion layer 4.

According to the second embodiment, the resin material injected from the injection molding device nozzle 31 is first introduced into the runner 22 provided in the fixed mold 12. That is, the resin supply mechanism is provided in the fixed mold 12 side. On the other hand, the extrusion mechanism is provided in the movable mold 13. For this reason, there is no operational interference between the resin supply mechanism and the extrusion mechanism. As a result, a marked decrease in cost results with regard to the molding device 11, and, in turn, the manufacture of the instrument panel 1. Moreover, since there is no interference between the two mechanisms, it is possible to facilitate the design of the molding device 11, and improve the freedom of design.

Furthermore, the injected resin material fills the inside of the cavity 17 after first being dispersed inside the main gate 21A. Accordingly, resin material does not directly contact or impinge the elastic sheet material 3, so direct and local application of pressure and heat from the resin material is inhibited. Consequently, damage to the elastic sheet material 3 due to pressure and heat can be substantially avoided. As a result, it is possible to avoid defects in the external appearance of the finished resin product.

In addition, because the main gate 21A is formed in the shape of a flat plate, and because resin material remains inside the main gate 21A, a rib 7 is formed integral with the substrate body 2 which projects from the substrate body 2 to the rear face side. As a result, since the excess part of the resin material corresponding to the main gate 21A is formed in a flat shape (like a thin wall), the solidification time does not significantly vary during cooling. The occurrence of so-called "sink marks" on the surface of the substrate body 2 is therefore avoided. Thus, it is possible to avoid defects in external appearance of the finished product due to shrinkage marks.

Finally, the instrument panel 1 itself can be beneficially reinforced by the rib 7 corresponding to the main gates 21A. Therefore, the strength and rigidity of the instrument panel 1 can be increased. Moreover, in contrast with the conventional process, where the resin material corresponding to the gates is excess waste, the resin material corresponding to the main gates 21A can be used as part of the instrument panel 1, in this embodiment. Consequently, waste of excess resin material can be reduced, and it is possible to improve yield.

Embodiment 3

Figure 16:
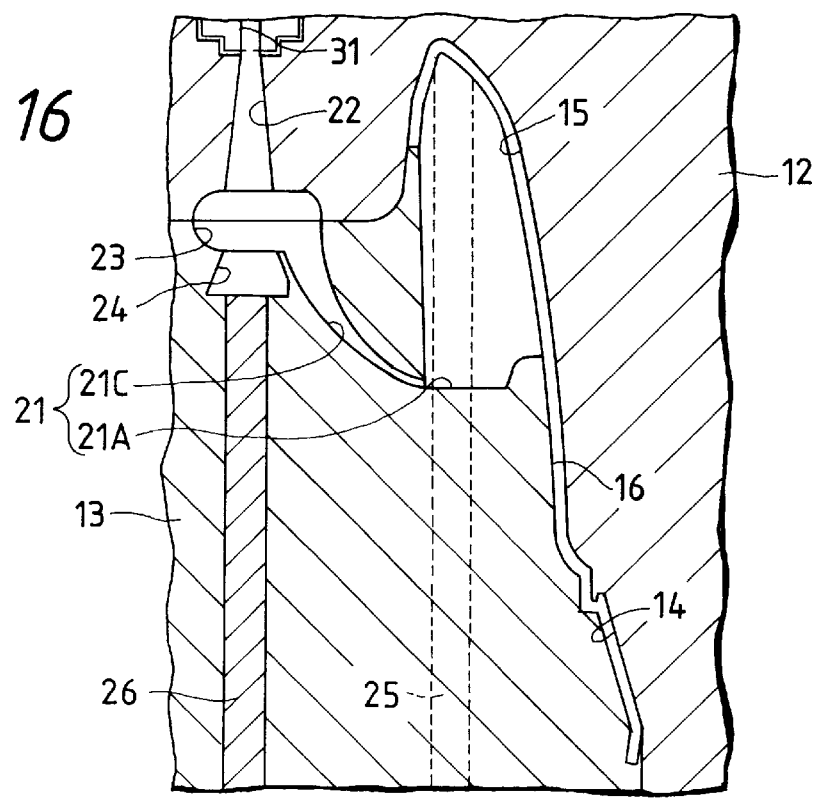
FIG. 16 is a partial sectional view which shows the molding device according to a third embodiment of the present invention.
Figure 17:
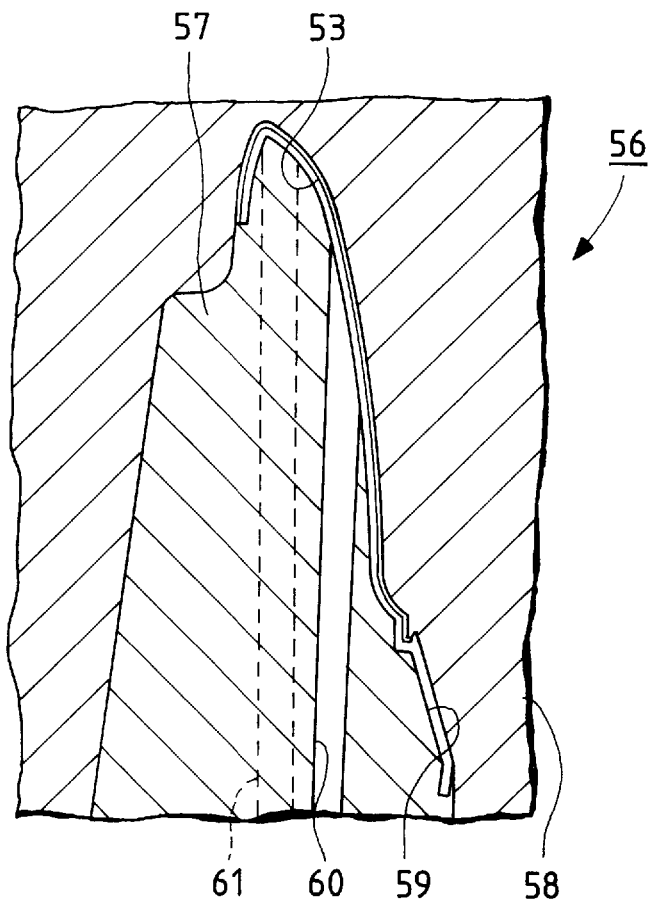
FIG. 17 is a sectional view which shows a conventional molding device for forming an instrument panel in the prior art.

In the second embodiment, the tunnel gate 21B was formed approximately in the shape of a truncated cone (almost linearly), but there are no restrictions on its shape. As shown in FIG. 16 for example, it is possible to use a curved tunnel gate 21C. By using this type of configuration, it is possible to reduce the distance between the runner 22 and the main gate 21A. Therefore, an advantage of size economy is realized.

It should be noted here that the present invention is in no way limited to the embodiments described above and that part of its constitution may appropriately be modified in such a way as described in the first embodiment.

Further, it is sufficient to have the extrusion mechanism provided in at least one place in the movable mold 13.

As mentioned above, it is possible to obtain a marked reduction in cost, and improved the freedom of design according to this embodiment.

Embodiment 4

Figure 18:
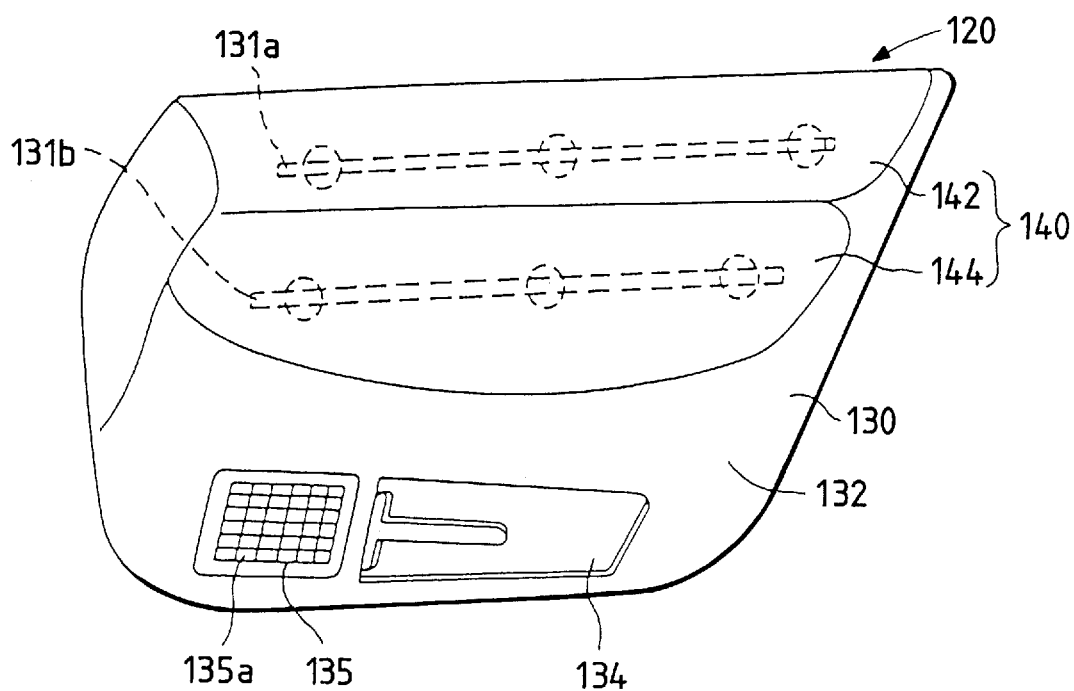
FIG. 18 is an exterior perspective view of an automotive door trim.

FIG. 18 is front perspective view of an automotive interior door trim 120 produced according to the molding methods of the present invention. As FIG. 19 shows, the door trim 120 consists of a resin substrate 130 and a decorative skin 140 that is thermally fused to part of a surface of the resin substrate 130.

The resin substrate 130 is formed of a hard resin material selected from among various thermoplastic resins such as polypropylene (PP) and polyethylene (PE) and has a thickness of, for example, 2 to 3 mm. The resin substrate 130 serves as a structural base that is to be mounted on a door panel (not shown). To provide strength, the resin substrate 130 has ribs 131a and 131b (see FIG. 19, showing a rear perspective view of the door trim 120) that extend parallel to each other in a substantially horizontal direction. The portion of the resin substrate 130 which is not covered by the skin 140 is indicated by 132. The hard resin substrate remains exposed there. The exposed area 132 of the resin substrate 130 has an opening 134 in a lower part thereof that is to be covered with another decorative member (not shown). A speaker grill 135 through which sound is emitted from an audio speaker may be provided adjacent to the opening 134. The speaker grill 135 has a number of small through-holes 135a.

Figure 19:
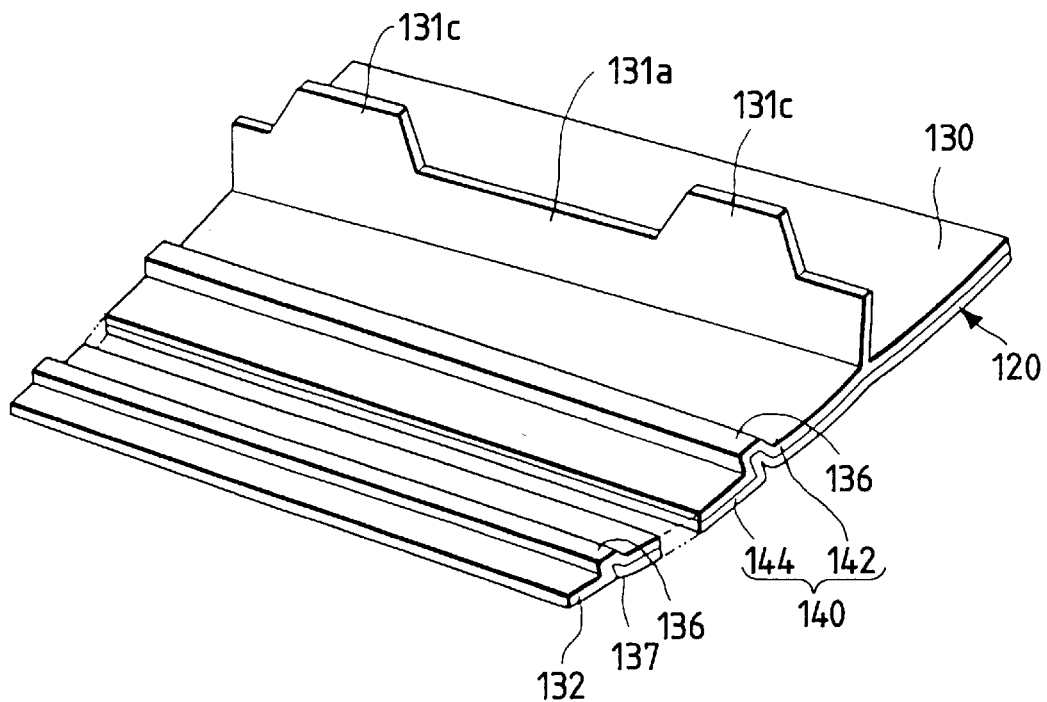
FIG. 19 is a perspective view showing an essential part of a back side of the door trim seen in FIG. 18.

As seen in FIG. 19, skin 140 consists of an upper skin 142 situated in the upper part of the resin substrate 130 (relative to FIG. 18) and a lower skin 144 that is situated below the upper skin 142 and above exposed area 132 (relative to FIG. 18) and which is joined at its top edge to the lower edge of said upper skin 142.

Figure 20:
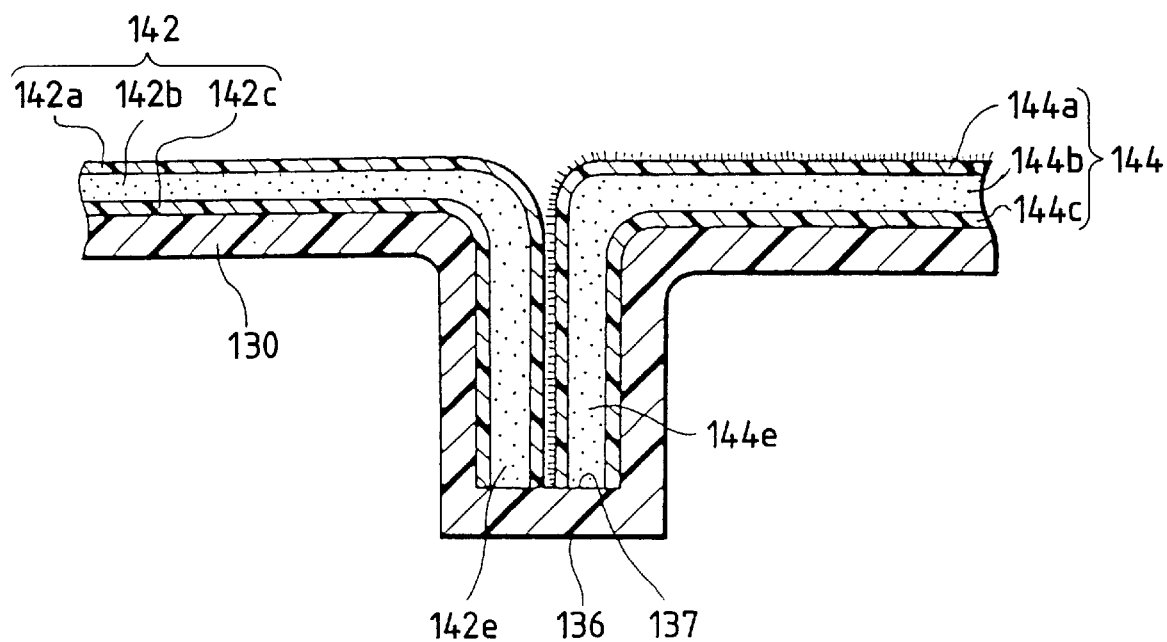
FIG. 20 is a sectional view showing an area around joining end portions of an upper skin and a lower skin.

As shown in FIG. 20, the upper skin 142 consists of three layers: an exterior skin layer 142a, a foam intermediate layer 142b, and an internal cover layer 142c, to provide an interior trim having a soft resilient feel. Similarly, the lower skin 144 consists of three layers: an exterior skin layer 144a, an intermediate foam layer 144b, and an internal cover layer 144c. In addition, decorative bristles or fibers may be embedded in the surface of the skin layer 144a.

The mating edge portions of the upper skin 142 and the lower skin 144 are both bent to form joining edge portions 142e and 144e, respectively, that adhere to each other as shown in FIG. 20. The resin substrate 130 has a closing base 136 that surrounds the joining edge portions 142e and 144e.

Figure 21:
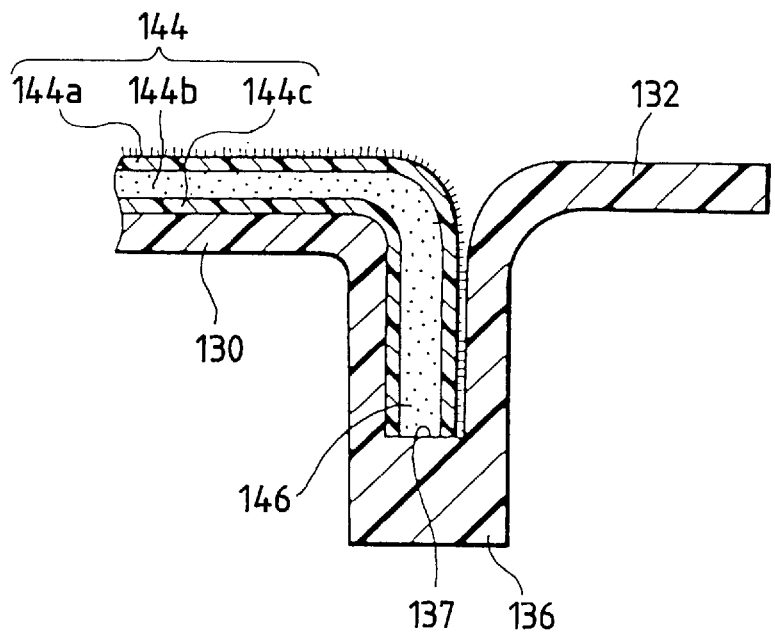
FIG. 21 is a sectional view showing the area around the outer peripheral edge portion of the lower skin.

The boundary between the exposed area 132 of the resin substrate 130 and the lower skin 144 is formed in such a way that the outer peripheral edge portion 146 of the lower skin 144 is situated within a recess 137 (see FIG. 21) provided in the resin substrate 130.

The process for producing the door trim 120 is now described. First, a skin forming sheet 150 is formed from which the upper skin 142 and the lower skin 144 are obtained (see FIG. 22). The skin sheet 150 can be prepared by coextruding, for example, a skin layer forming sheet 150a, a foam layer forming sheet 150b, and a cover layer forming sheet 150 so that they are thermally fused together into a laminate. The respective sheets are made of, for example, thermoplastic olefinic resins (TPO) such as polyvinyl chloride (PVC) and polypropylene (PP). The lower skin 144 is formed from the same sheet 150 except that bristles or fibers may be embedded in the surface of the skin layer forming sheet 150a.

Figure 22:
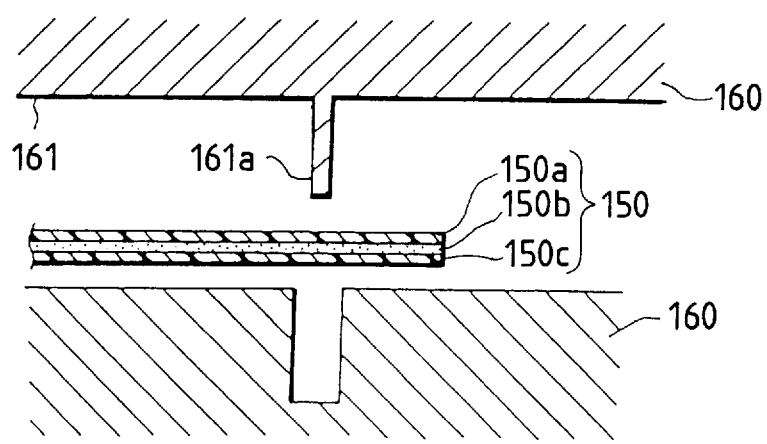
FIG. 22 is an illustration of a vacuum forming process.

Subsequently, the skin forming sheet 150 is given a predetermined shape by a known vacuum forming technique. More specifically, both sides of the skin forming sheet 150 are heated to a predetermined temperature with a heater and placed in position within a vacuum forming mold 160, as seen in FIG. 22. Suction is applied by means of a vacuum pump, whereupon the sheet 150 adopts a shape that conforms to the shaping surface 161 of the mold 160. The shaping surface 161 has a ridge 161a that will provide a shape conforming to the closure portion 182a of a forming mold 180, described below (see FIG. 24). Since vacuum forming techniques are relatively well known, specific details are not described here.

Figure 23:
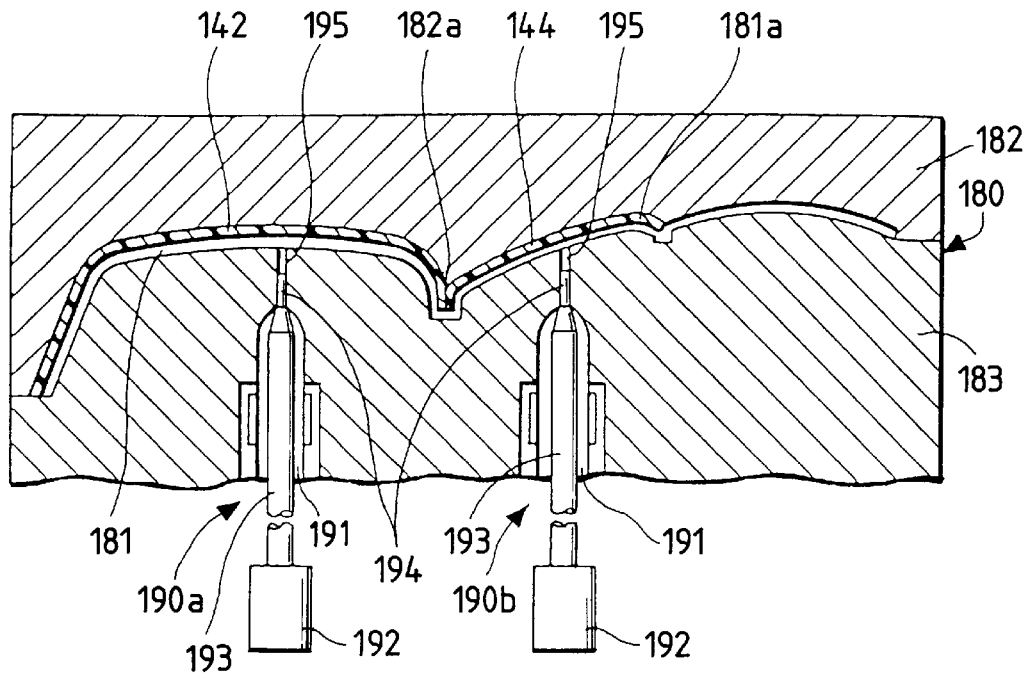
FIG. 23 is an illustration of an injection molding process.

In the next step, the substrate body 130 is formed as an integral part of the skin 140 by injection molding, as shown in FIG. 23. Injection molding, according to this embodiment, consists of injecting a molten resin into a molding cavity 181 in a mold 180 from a known injection molding machine, through a first on/off gate 190a and a second on/off gate 190b. The mold 180 has a female part 182 and a core 183 that is to be fitted into a recess 181a provided in the female part 182. For clamping, the female part 182 is advanced toward the core 183 and for mold opening, the female mold 182 is retracted from the core 183. Cavity 181 is defined by female part 182 and core 183 as a result of clamping.

Figure 25:
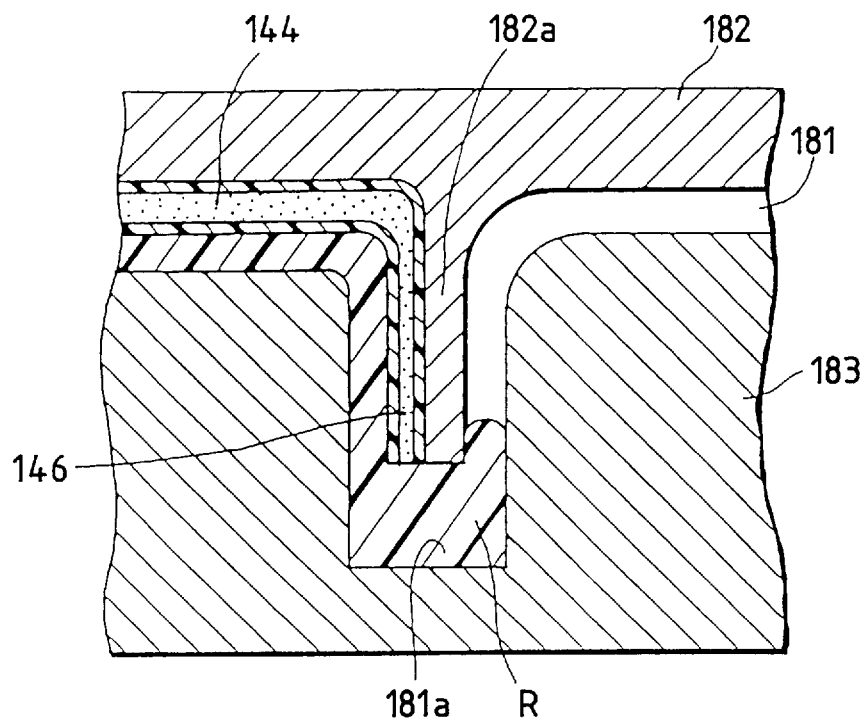
FIG. 25 is an illustration of the area around the outer peripheral edge portion of the lower skin that is formed by injection molding.

The first on/off gate 190a is provided at, for example, three sites in the core 183 that correspond to the upper skin 142. Similarly, the second on/off gate 190b is fitted at, for example, three sites in the core 183 that correspond to the lower skin 144. The first and second on/off gates have the same mechanism and each comprises a resin feed compartment 191 connected to an injection port (not shown) on the injection molding machine and a gate pin 193 that is advanced or retracted by means of a hydraulic air cylinder 192. The gate pin 193 establishes or blocks communication with the opening in the resin feed compartment 191. The resin feed compartment 191 is connected to the molding cavity 181 via a runner 194 and a gate 195. The runner 194 is provided in such a way as to form trapezoidal portions 131C (see FIG. 19) of each of the ribs 131a and 131b on the resin substrate 130 at opposite ends. When the gate pins 193 of the first and second on/off gates 190a and 190b are detached from the openings of the runners 194 by means of the drive force of the hydraulic cylinders 192, a molten resin R is injected from the injection molding machine to flow into the cavity 181 via the resin feed compartments 191, runners 194 and gates 195 (see FIG. 25).

Figure 26:
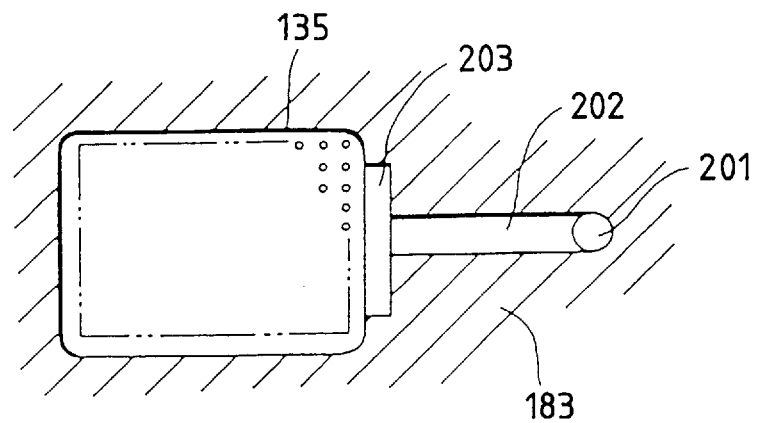
FIG. 26 is an illustration of the area around the speaker grill that is formed by injection molding.

The molding surface of the female part 182 has closure portions 182a formed thereon (see FIGS. 24 and 25) to position the upper skin 142 and the lower skin 144. It also has an injection port 201, a runner 202 and a film gate 203 (see FIG. 26) to form the speaker grill 135. The closure portion 182a shown in FIG. 24 conforms with the joining edge portions 142e and 144e of the upper skin 142 and the lower skin 144, respectively. The closure portion 182a shown in FIG. 25 conforms with the outer peripheral edge portion 146 of skin 140, not including the joining edge portions 142e and 144e. The film gate 203 shown in FIG. 26 is connected to a runner 202 and is wide enough to uniformly dissipate the pressure of the resin being injected through the runner 202 so that the through-holes 135a can be formed without burrs.

Next, the resin substrate 130 is formed in superposition on the skin 140. First, with the female part 182 separated from the core 183, the vacuum-formed upper skin 142 and lower skin 144 is oriented in the female part 182. In this instance, the upper skin 142 and the lower skin 144 are positioned in such a way that they conform to the closure portions 182a, whereby the joining edge portions 142e and 144e of the upper skin 142 and lower skin 144, respectively, are adhered to each other (see FIG. 24).

Subsequently, the core 183 and the female part 182 are clamped together and resin material is injected to mold the resin substrate 130 (as shown in FIG. 23). The resin injection may have a delayed action, in which injection through the first on/off gate 190a is followed, after a short delay (e.g., one second), by injection through the second on/off gate 190b.

Figure 24:
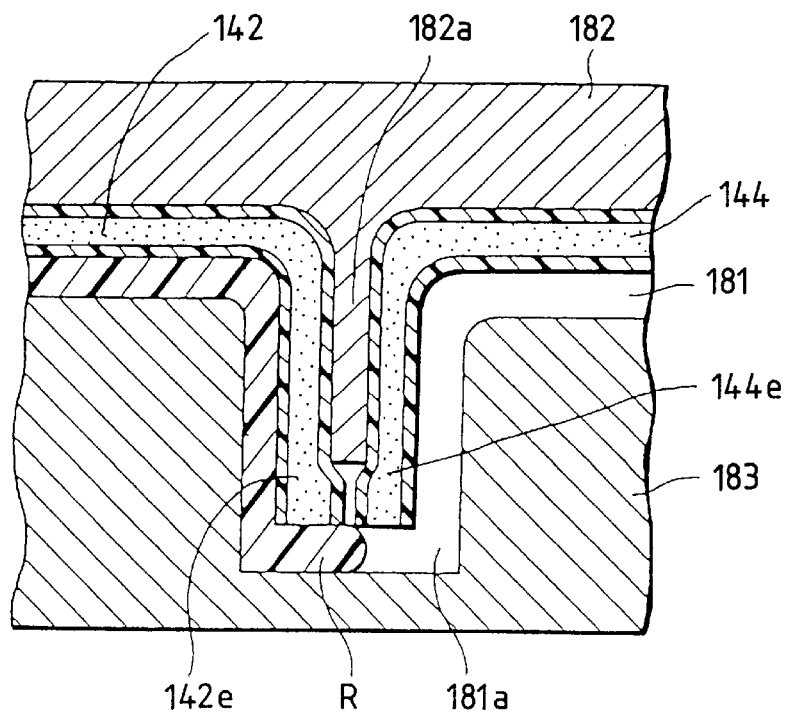
FIG. 24 is an illustration of the area around the joining end portions of the upper skin and the lower skin that are formed by injection molding.

More specifically, the gate pin 193 of the first on/off gate 190a is displaced and a molten resin is injected toward the upper skin 142 through the resin feed compartment 191, runner 194, and the gate 195. The molten resin therefore flows through the cavity 81 as shown in FIG. 24 (in which the flowing resin is indicated by R). Then, by the time the advancing edge of the molten resin R injected through the first on/off gate 190a has reached the second on/off gate 190b, another stream of the molten resin is injected through the second on/off gate 190b. The two streams of the molten resin join together to fill the cavity 181, thereby forming the molded resin substrate 130. A third stream of the molten resin is supplied through the injection port 201 and the runner 202, and the injection pressure is lowered uniformly at the film gate 203 so as to form the speaker grill 235 having through-holes 135a.

When the molten resin cools and solidifies, the mold is opened and the molded resin part is removed and subjected to post-molding processing, thereby yielding a complete door trim 120. During the molding operation, the foam layers 142b and 144b of the skin 140 are compressed under the closure portions 182a of the mold 180 but they expand to their initial shape upon demolding. As a result, the gap between the upper skin 142 and the lower skin 144 is effectively eliminated to provide a smooth parting line therebetween.

As described above, the molten resin is injected through the second on/off gate 190b at the time when the advancing edge of the molten resin injected through the first on/off gate 190a has effectively reached the second on/off gate 190b;

hence, the two streams of the molten resin are fused together and no weld line is visible therebetween, even in the exposed area 132 of the resin substrate 130.

The molten resin R as injected toward the skin through the first and second on/off gates 190a and 190b does not have a high injection pressure since it passes through the runner 194, which assures sufficient distance from the skin 140. Thus, the skin 140 does not have gate marks that will collapse the foam layers 142b and 144b. This contributes to a good overall appearance of the skin 140.

In the molding methods described above, the molten resin is injected from the first on/off gate 190a and the second on/off gate 190b which are each provided in a plurality of positions that face the skin 140. Therefore, even if the molten resin R is injected at low pressure through the first and second on/off gates 190a and 190b, it will spread to every part of the resin substrate 130 which has a large enough area to include the exposed area 132 which is not covered with the skin. Hence, the molten resin R being injected at low pressure through the first and second on/off gates 190a and 190b will not have gate marks in those areas of the skin 140 which oppose the gates 195 and, as a result, the shaped resin part maintains a good appearance.

Additionally, the pre-formed upper skin 142 and lower skin 144 are oriented in the mold 180 so that their joining edge portions 142e and 144e conform to the closure portion 182a of the mold 180. This insures that the joining edge portions 142e and 144e are not only positioned in registration with the closure portion 182a, but are also adhered to each other. When injection molding is performed with the upper and lower skins oriented in the manner described above, there is no burr-forming leakage of the molten resin R from between the joining edge portions 142e and 144e. The resultant door trim 120 therefore has a good-looking parting line.

It should be noted here that the invention is by no means limited to the embodiment described above and it may be implemented in various other ways without departing from the spirit and scope of the invention, as exemplified by the following modifications.

A plurality of gates may be provided so that one of them faces the skin, whereas another gate is in a position where there is no skin. Injection is performed in such a way that the molten resin injected through one gate and the molten resin injected through the other gate will contact each other in the exposed (i.e., uncovered) area of the resin substrate (i.e., the area exterior to an edge of the skin). There will therefore be no defects such as curling of the skin because molten resin injected through the other gate migrates thereunder.

In the fourth embodiment, the timing of injection through the second on/off gates is slightly delayed relative to the first on/off gate. If desired, the injection port for injection molding the speaker grill may be fitted with on/off gates similar to the first or second on/off gate so that molding in that area is performed at a delayed time relative to the second on/off gate.

Also in this embodiment, the concept of the invention is applied to a door trim, but it may be applied to any other molded resin parts that have the common feature of having one or more skins superposed on the resin substrate in a selected area.

Further, in the fourth embodiment, a three-layered skin is formed over the resin substrate, but various other layer structures may be employed, such as a simple structure consisting of a hard skin layer, or a dual layer structure having a hard skin layer lined with a soft foam layer.

What is claimed is:

1. A method for molding a sheet material to at least a portion of a resin substrate, comprising the steps of:
   positioning a first sheet material portion and a second sheet material portion in an open first mold part in a non-overlapping orientation;
   engaging the first mold part with a second mold part to thereby form a closed molding cavity therebetween;
   injecting a molten resin material into the closed molding cavity through a plurality of gates provided in one of the first and second mold parts to form a molded resin substrate, the temperature of the molten resin material being sufficient to cause the first and second sheet material portions to fuse to the resin material as the resin material cools;
   forming a plurality of laterally spaced-apart reinforcing portions from the molten resin material integral with the molded resin substrate at positions corresponding to the plurality of gates, said reinforcing portions extending perpendicularly outward from the molded resin substrate;
   opening the closed molding cavity; and
   removing a molded resin article having first and second sheet material portions fused to at least a portion of the molded resin substrate.

2. The method according to claim 1, further comprising the step of ejectingly removing the molded resin article from the first and second mold parts.

3. The method according to claim 2, wherein the molded resin article is ejectingly removed from the first and second mold parts by at least one eject member disposed in one of the first and second mold parts.

4. The method according to claim 1, wherein said injecting step further comprises the steps of:
   passing the molten resin material through one of more intermediate mold paths communicating with one or more of the plurality of gates prior to injecting the molten resin material into the closed molding cavity, thereby forming one or more resin sprues along the one or more intermediate mold paths as the resin material cools, wherein the one or more resin sprues have a shape which resists separation from one of the first and second mold parts.

5. The method according to claim 4, wherein the injecting step further includes passing the molten resin material through one or more tunnel gates prior to injecting the molten resin material into the closed molding cavity.

6. The method according to claim 4, wherein the injecting step includes passing the molten resin material through one or more curved tunnel gates prior to injecting the molten resin material into the closed molding cavity.

7. The method according to claim 4, wherein said step of forming one or more resin sprues includes forming the one or more resin sprues with an enlarged portion that resists separation from one of the first and second mold parts.

8. The method according to claim 4, further including the step of separating the one or more sprues from the molded resin article and from the one or more intermediate mold paths.

9. The method according to claim 8, further comprising the step of applying an ejecting force to each of the one or more sprues and to the molded resin article thereby shearingly separating the one or more sprues and the molded resin article from each other and from the first and second mold parts.

10. The method according to claim 1, wherein the plurality of reinforcing portions joined to the molded resin article have a vertical height less than a vertical height of the molded resin article.

11. The method according to claim 1, wherein the plurality of reinforcing portions joined to the molded resin article have a vertical height less than a vertical height of the sheet material portions.

12. The method according to claim 1, including a step of shaping the sheet material portions so as to conform with one of the first and second mold parts prior to positioning the sheet material portions in the open first mold part.

13. The method according to claim 11, further including vacuum-molding the sheet material portions.

14. A method for molding a sheet material to at least a portion of a resin substrate, comprising the steps of:
    positioning a sheet material portion in an open first mold part;
    engaging the first mold part with a second mold part to thereby form a closed molding cavity therebetween;
    injecting a molten resin material into the closed molding cavity through one or more intermediate mold paths communicating with one or more of a plurality of gates provided in one of the first and second mold parts to form a molded resin substrate, the temperature of the molten resin material being sufficient to cause the sheet material portion to fuse to the resin material as the resin material cools;
    forming one or more resin sprues with an enlarged portion along the one or more intermediate mold paths as the resin material cools, wherein the enlarged portion of the one or more resin sprues resists separation from one of the first and second mold parts;
    forming a plurality of laterally spaced-apart reinforcing portions from the molten resin material integral with the molded resin substrate at positions corresponding to the plurality of gates, said reinforcing portions extending perpendicularly outward from the molded resin substrate;
    opening the closed molding cavity; and removing a molded resin article comprising a sheet material portion fused to at least a portion of the molded resin substrate.

15. The method according to claim 14, further comprising the step of ejectingly removing the molded resin article from the first and second mold parts.

16. The method according to claim 15, wherein the molded resin article is ejectingly removed from the first and second mold parts by at least one elect member disposed in one of the first and second mold parts.

17. The method according to claim 14, wherein the injecting step further includes passing the molten resin material through one or more tunnel gates prior to injecting the molten resin material into the closed molding cavity.

18. The method according to claim 14, wherein the injecting step includes passing the molten resin material through one or more curved tunnel gates prior to injecting the molten resin material into the closed molding cavity.

19. The method according to claim 14, further including the step of separating the one or more sprues from the molded resin article and from the one or more intermediate mold paths.

20. The method according to claim 19, further comprising the step of applying an ejecting force to each of the one or more sprues and to the molded resin article thereby shearingly separating the one or more sprues and the molded resin article from each other and from the first and second mold parts.

21. The method according to claim 14, wherein the plurality of reinforcing portions joined to the molded resin article have a vertical height less than a vertical height of the molded resin article.

22. The method according to claim 14, wherein the plurality of reinforcing portions joined to the molded resin article have a vertical height less than a vertical height of the sheet material portion.

23. The method according to claim 14, including a step of shaping the sheet material portion so as to conform with one of the first and second mold parts prior to positioning the sheet material portion in the open first mold part.

24. The method according to claim 22, further including a step of vacuum-molding the sheet material portion.

25. A method for molding a sheet material to at least a portion of a resin substrate, comprising the steps of:
    positioning a sheet material portion in an open first mold part;
    engaging the first mold part with a second mold part to thereby form a closed molding cavity therebetween;
    injecting a molten resin material into the closed molding cavity through one or more intermediate mold paths communicating with one or more of a plurality of gates provided in one of the first and second mold parts to form a molded resin substrate, the temperature of the molten resin material being sufficient to cause the sheet material portion to fuse to the resin material as the resin material cools;
    forming one or more resin sprues along the one or more intermediate mold paths as the resin material cools, wherein the one or more resin sprues have a shape which resists separation from one of the first and second mold parts;
    forming a plurality of laterally spaced-apart reinforcing portions from the molten resin material integral with the molded resin substrate at positions corresponding to the plurality of gates, said reinforcing portions extending perpendicularly outward from the molded resin substrate;
    opening the closed molding cavity; and
    removing from the first and second mold parts a molded resin article comprising a sheet material portion fused to at least a portion of the molded resin substrate, wherein an ejecting force is applied to each of the one or more resin sprues and to the molded resin article, to shearingly separate the one or more resin sprues and the molded resin article from each other and from the first and second mold parts, and to separate the one or more resin sprues from the one or more intermediate mold paths.

26. The method according to claim 25, further comprising the step of ejectingly removing the molded resin article from the first and second mold parts.

27. The method according to claim 26, wherein the molded resin article is ejectingly removed from the first and second mold parts by at least one eject member disposed in one of the first and second mold parts.

28. The method according to claim 25, wherein the injecting step further includes passing the molten resin material through one or more tunnel gates prior to injecting the molten resin material into the closed molding cavity.

29. The method according to claim 25, wherein the injecting step includes passing the molten resin material through one or more curved tunnel gates prior to injecting the molten resin material into the closed molding cavity.

30. The method according to claim 25, wherein said step of forming one or more resin sprues includes forming the one or more resin sprues with an enlarged portion that resists separation from one of the first and second mold parts.

31. The method according to claim 25, wherein the plurality of reinforcing portions joined to the molded resin article have a vertical height less than a vertical height of the molded resin article.

32. The method according to claim 25, wherein the plurality of reinforcing portions joined to the molded resin article have a vertical height less than a vertical height of the sheet material portion.

33. The method according to claim 25, including a step of shaping the sheet material portion so as to conform with one of the first and second mold parts prior to positioning the sheet material portion in the open first mold part.

34. The method according to claim 32, further including vacuum-molding the sheet material portion.

* * * * *